United States Patent [19]

Abraham, Jr.

[11] Patent Number: 5,843,261
[45] Date of Patent: Dec. 1, 1998

[54] METHOD AND APPARATUS FOR PREPARING BEVERAGE TRANSMISSION LINES

[76] Inventor: Martin J. Abraham, Jr., 57092 Allen Rd., Slidell, La. 70461

[21] Appl. No.: 717,825

[22] Filed: Sep. 23, 1996

[51] Int. Cl.⁶ ..................................................... B32B 31/00
[52] U.S. Cl. ........................ 156/184; 156/195; 156/166; 156/425; 156/392
[58] Field of Search ..................................... 156/184, 187, 156/188, 190, 195, 143, 171, 392, 425, 430, 431, 432, 166

[56] References Cited

U.S. PATENT DOCUMENTS

| | | |
|---|---|---|
| 2,684,318 | 7/1954 | Meek . |
| 2,758,366 | 8/1956 | Voetelink ............................. 156/432 X |
| 3,034,566 | 5/1962 | McKay . |
| 3,420,722 | 1/1969 | McNulty et al. . |
| 3,761,335 | 9/1973 | Cichoski et al. . |
| 3,769,127 | 10/1973 | Goldsworthy et al. ............. 156/432 X |
| 5,008,061 | 4/1991 | Bluck et al. . |
| 5,084,221 | 1/1992 | Matsuno et al. . |
| 5,173,139 | 12/1992 | Rippingale et al. ................ 156/195 X |
| 5,174,846 | 12/1992 | Bate et al. .......................... 156/195 X |
| 5,223,066 | 6/1993 | Dokmo et al. . |
| 5,283,014 | 2/1994 | Oestreich et al. . |

Primary Examiner—James Engel
Attorney, Agent, or Firm—Garvey, Smith, Nehrbass & Doody, L.L.C.

[57] ABSTRACT

Method and apparatus for preparing beverage transmission lines to form bundles that convey a drink product to a remote location includes the step of providing a plurality of spools that include a wound length of beverage conveying tubing each with a free end portion and unwinding the beverage tube from each spool by advancing the free end portion. The free end portions are transmitted through a plurality of templates that gather the tubing together. The tubing is then choked into a tight bundle while being continuously advanced at a set desired speed and along a generally linear path. The bundle is then spirally wrapped as it is being transported. The spiral wrapping can be achieved with a rotating spool that surrounds the bundle.

24 Claims, 2 Drawing Sheets

METHOD AND APPARATUS FOR PREPARING BEVERAGE TRANSMISSION LINES

BACKGROUND OF THE INVENTION

1. Field of the Invention

The present invention relates to the beverage dispensing industry and more particularly to an improved method and apparatus for the preparation of beverage transmission lines to form bundles for conveying refrigerated drink products to a remote location. More particularly the present invention relates to an improved method of preparing beverage transmission lines to form bundles for conveying drink products to a remote location through a plurality of flowlines, wherein the flowlines are dispensed from storage reels through a plurality of templates, each having sequentially tighter groups of openings that support the various hoses prior to a formation of a bundle.

2. General Background

In the beverage dispensing industry, it is desirable to convey a number of different drink products from a remote location to a dispensing location through a plurality of drink dispensing hoses. It is desirable to hold these hoses in a tight bundle so that a refrigerant can be conveyed in two or more of the hoses for cooling the entire bundle.

The construction of such bundles of beverage dispensing lines is both time consuming and labor intensive.

It is an object of the present invention to provide an improved method and apparatus for the preparation of beverage transmission lines to form bundles that convey a drink product to a remote location through the various individual flowlines.

SUMMARY OF THE INVENTION

The present invention solves these prior art problems and shortcomings by providing a plurality of spools each including a wound length of beverage conveying tubing, each of the lengths of tubing having a free end portion.

Each of the lengths of beverage tubing is gradually unwound from the spool by advancing the free end portion of the length of tubing.

The free end portions of each length of tubing are routed through a first template that gathers the tubing together. The unwinding tubing free end portions are choked together as a group using sequentially placed templates until the tubing end portions are gathered tightly together immediately adjacent to the last template.

With the method of the present invention, the lengths of tubing are continuously advanced at a set speed and along a generally linear path. After the plurality of lengths of beverage tubing have been dispensed from each spool, they are passed through the plurality of templates. They are then spirally wrapped with a binding material that holds the advancing lengths of tubing together in a bundle.

After spiral wrapping, the discharged bundle is placed into an elongated trough. The tubing is pulled at its free end with a cable, moving the bundle along the trough until a desired length is obtained. In this manner, bundles can be made very long, such as five hundred feet (500') long, for example.

With the method of the present invention, the bundle is advanced at a rate of about one foot per minute.

The method of the present invention further comprises the providing of a plurality of spools that each include a wound length of beverage conveying tube each with a free end portion and one or more coolant conveying tubes that are placed at the center of the multiple beverage conveying tubes.

The method of the present invention comprises the step of advancing the bundle in an elongated trough that is an excess of five hundred feet in length.

In the preferred method, the plurality of spools include eight spools that each contain a beverage and coolant conveying flowline.

With the method of the present invention, each length of unwinding beverage conveying tubing contacts an adjacent length of tubing.

With the method of the present invention, the lengths of tubing are bound together with adhesive backed binding material that spirally wraps and coats the advancing length of tubing holding them together in a bundle.

The apparatus of the present invention provides a device the forms an elongated continuous bundle of beverage lines. The apparatus includes a plurality of spools, each holding a wound length of beverage tubing.

A template is provided for gathering the lengths of tubing together in a desired pattern.

A choke is provided for holding the plurality of lengths of tubing together. A machine frame rotatably supports a rotary member about a center of rotation, the rotary member defining a plane and having an open center that allows the bundle to pass therethrough generally perpendicularly to the train of the rotary member.

A tensile cable is provided for applying tension to the bundle for advancing it.

An elongated trough supports the bundle during wrapping. The trough is preferably very long, such as for example five hundred feet in length.

A spool of binding material is mounted on the rotary member at a position spaced from the center of rotation. A winch is provided that applies tension to the bundle as it is advanced.

A motor drive rotates the rotating member during a spiral wrapping of the plurality of beverage dispensing lines.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 3 is a schematic view illustrating a step of the method of the present invention.

DETAILED DESCRIPTION OF THE PREFERRED EMBODIMENT

Figure 1:
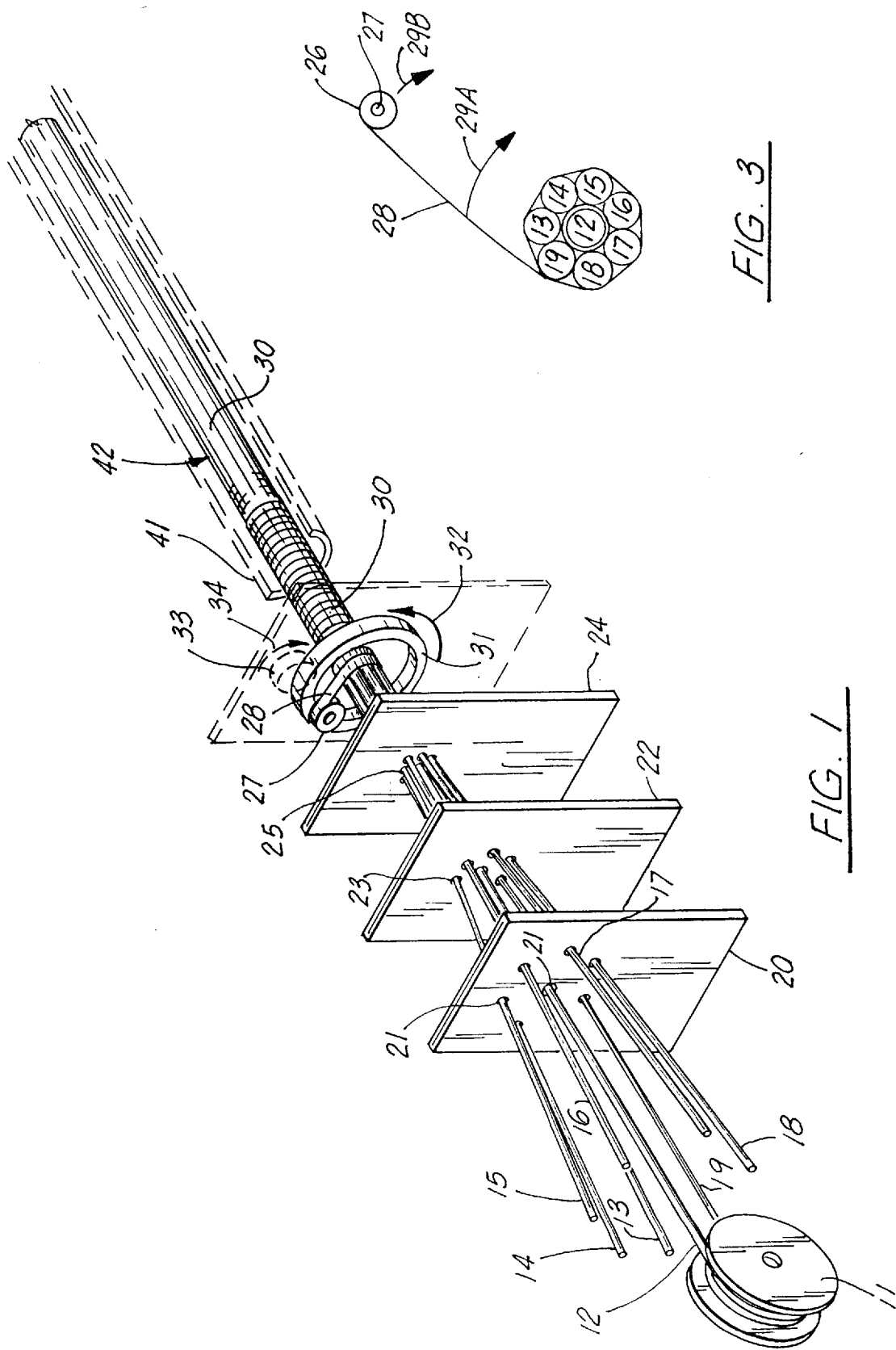
FIG. 1 is perspective fragmentary view of the preferred embodiment of the apparatus of the present invention.
Figure 2:
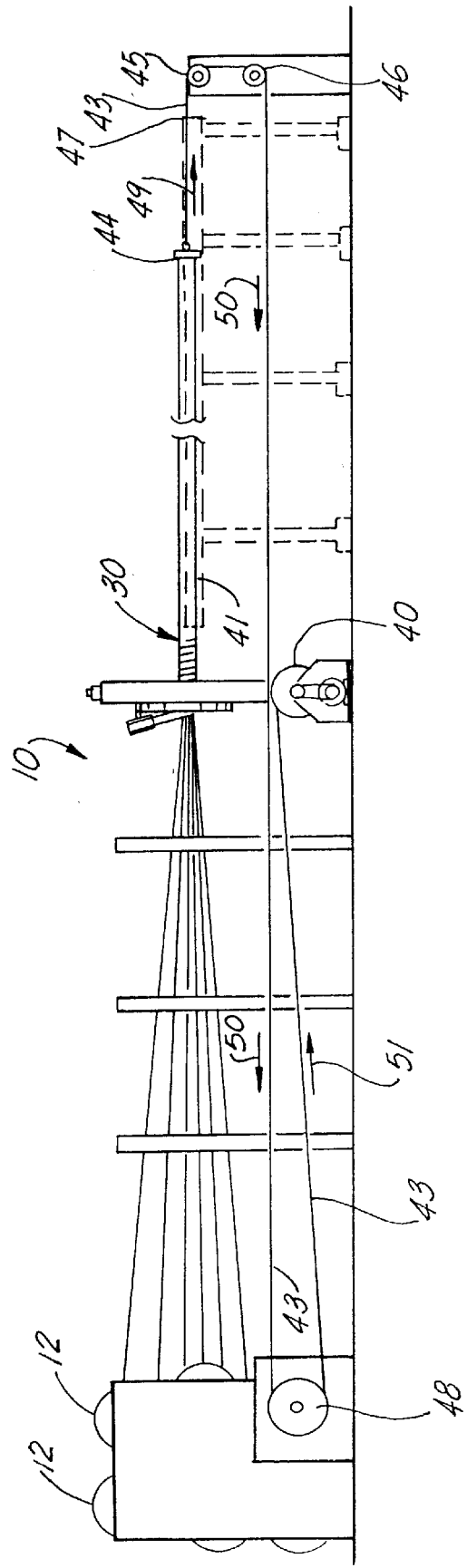
FIG. 2 is an elevational view of the preferred embodiment of the apparatus of the present invention.

FIGS. 1 and 2 show the preferred embodiment of the apparatus of the present invention designed generally by the numeral 10 in FIG. 2. Apparatus 10 for forming an elongated continuous bundle of beverage lines includes a plurality of spools 11, each spool being wound with an elongated length of beverage dispensing tubing 12 as shown in FIG. 1. In the preferred embodiment, there are eight spools 11, each carrying a beverage dispensing line such as 12. In FIG. 1, a plurality of beverage dispensing flowlines. There are preferably seven flowlines 13–19 that convey beverage and coolant. There is a central flowline 12 that can convey coolant. In the preferred embodiment, the lines 13–19 surround line 20 as shown in FIG. 1A.

A first template 20 has seven openings 21 that receive the plurality of lengths of tubing 12–19. A second template 22 likewise contains a plurality of openings 23. However, the pattern of openings of template 22 is spaced closer than the pattern of openings 21 of template 20. Similarly, there is a third template 24 that has a plurality of openings 25 spaced closer together than the openings 23 of template 22.

The plurality of templates 20, 22, 24 gradually choke the flowlines 12–19 into a tight group or a bundle just before they are wrapped with an adhesive web of material such a roll of adhesive backed tape. A forced air heater is preferably used to preliminarily heat each length of tubing before wrapping begins with web 28 of adhesive tape. In FIG. 1, the roll of tape is designated as 26 and provides a spool 27 with a web 28 of tape that spirally wraps a bundle 30 of flowlines 12–19. A rotary spool 31 rotates in the direction of arrow 32. The spool 31 is drive by motor drive 33 that rotates in the direction of 34.

The spool 27 moves in a circular pattern tracked by the rotating spool 31. This gradually unfurls tape web 28 and encircles the bundle 30 as shown in FIG. 1. In order to create a spiral wrapping of the bundle 30, the various lines 12–19 are advanced continuously using winch 40.

In FIG. 2, bundle 30 is discharged into an elongated trough 41. The trough 41 is U-shaped having a hollowed portion 42 that cradles the bundle 30 as it is being wrapped. A cable 43 is attached to bundle 30 at connection 44. The cable 43 rides upon a pair of idler pulleys 45, 46 that are located at the far end 47 of trough 41.

An additional idler pulley 48 is placed adjacent the supply spools 12 and can be used to double the mechanical advantage of the cable 43. In FIG. 2, arrows 49–50 show the direction of cable 43 after leaving bundle 30 and sheaves 45–46. The arrow 51 designates the direction of travel of cable 43 in between pulley 48 and winch 40.

The following table lists the parts numbers and parts descriptions as used herein and in the drawings attached hereto.

PARTS LIST

| Part Number | Description |
| --- | --- |
| 10 | beverage tubing bundler |
| 11 | spool |
| 12 | flowline |
| 13 | flowline |
| 14 | flowline |
| 15 | flowline |
| 16 | flowline |
| 17 | flowline |
| 18 | flowline |
| 19 | flowline |
| 20 | first template |
| 21 | opening |
| 22 | second template |
| 23 | opening |
| 24 | third template |
| 25 | openings |
| 26 | tape roll |
| 27 | spool |
| 28 | web |
| 30 | bundle |

-continued

PARTS LIST

| Part Number | Description |
| --- | --- |
| 31 | rotating spool |
| 40 | winch |
| 41 | trough |
| 42 | hollowed portion |
| 43 | cable |
| 44 | connection |
| 45 | idler pulley |
| 46 | idler pulley |
| 47 | end |
| 48 | idler pulley |
| 49 | arrow |
| 50 | arrow |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A method of preparing beverage transmission lines to form bundles for conveying a drink product to a remote location, comprising the steps of:

a) providing a plurality of spools that each include a wound length of beverage conveying tubing, each with a free end portion;

b) unwinding the beverage tubing from each spool by advancing the free end portion thereof;

c) transmitting the free unwinding end portions of each length of tubing through a first template that gathers the tubing together;

d) choking the unwinding tubing free end portions together with the template so that the tubing end portions are gathered together;

e) continuously advancing the lengths of tubing at a set speed and along a elongated path;

f) continuously wrapping the advancing lengths with a binding material that holds the advancing lengths of tubing together in a bundle;

g) discharging the wrapped bundle into an elongated trough;

h) covering the wrapped bundle with foam insulation;

i) wherein in step "e" the tubing is pulled at it's free end with a cable.

2. The method of claim 1 further comprising the step of preliminarily heating each length of beverage conveying tubing before steps f through i.

3. The method of claim 1 wherein step "e" comprises advancing the bundle at a rate of about one foot per minute.

4. The method of claim 1 wherein step "a" comprises providing a plurality of spools that each include a wound length of beverage conveying tubing, each with a free end portion, wherein there are at least seven beverage tubing sections that define a bundle.

5. The method of claim 1 wherein in step "g" comprises advancing the bundle into a trough that is in excess of five hundred feet in length.

6. The method of claim 1 wherein in step "g" comprises advancing the bundle into a trough that is in excess of one hundred feet in length.

7. The method of claim 1 wherein step "a" comprises providing a plurality of spools that each include a wound length of beverage conveying tubing, each with a free end portion, wherein there is at least one length of tubing that is a coolant carrying line, and each beverage carrying line is placed adjacent the coolant carrying line.

8. The method of claim 1 wherein in step "d", each length of unwinding beverage tubing contacts an adjacent length of unwinding tubing.

9. The method of claim 1 wherein step "f", comprises spirally wrapping the advancing lengths with a tape adhesive backed binding material that holds the advancing lengths of tubing together in a bundle.

10. The method of claim 9 wherein step spirally wrapping the advancing lengths with a tape adhesive backed binding material that holds the advancing lengths of tubing together in a bundle, and wherein the tape is spirally applied as the bundle continuously advances.

11. An apparatus for forming an elongated continuous bundle of beverage lines for conveying beverage, comprising:
 a) a plurality of spools, each for holding a wound length of beverage tubing;
 b) a plurality of spaced apart templates for gathering the lengths of beverage tubing together;
 c) a choke for holding the plurality of lengths of tubing together;
 d) a machine frame rotatably supporting a rotary member about a center of rotation, the rotary member defining a plane and having an open center that allows the bundle to pass therethrough transversely to the plane of the rotary member;
 e) a tensile cable for applying tension to the bundle for advancing same;
 f) a trough that supports the bundle during wrapping;
 g) a spool of binding material that is mounted on the rotary member at a position spaced from the center of rotation;
 h) a pulling device for applying tension to the cable as it is advanced;
 i) motor drive means for rotating the rotating member.

12. The apparatus of claim 11 wherein each length of tubing is hollow, having hollow flow bores for conveying fluid.

13. The apparatus of claim 11 wherein there are a plurality of space apart templates, each having a plurality of openings.

14. The apparatus of claim 13 wherein the openings are in a circular pattern.

15. The apparatus of claim 13 wherein there are at least eight openings in each template.

16. The apparatus of claim 15 wherein there are a pair of templates.

17. The apparatus of claim 11 wherein the pulling device is a winch.

18. An apparatus for forming an elongated continuous bundle of beverage conveying flowlines in a configuration that enables coolant to cool beverage contained in the flowlines continuously along the length of the bundle, comprising:
 a) a plurality of spools each for holding a wound length of tubing for conveying a beverage;
 b) at least one spool for holding a wound length of tubing for carrying coolant;
 c) means for advancing the lengths of tubing for conveying beverage and for carrying coolant, unwinding them from the spools;
 d) means for binding the lengths of tubing together in a bundle as they are advanced so that each beverage conveying tubing contacts the coolant conveying tubing.

19. The apparatus of claim 18 wherein there are at least four lengths of beverage conveying tubing in the bundle.

20. The apparatus of claim 18 wherein there are seven lengths of beverage containing tubing in the bundle.

21. The apparatus of claim 18 further comprising a template positioned next to the spools for holding the lengths of tubing together after they are unwound from the spools.

22. The apparatus of claim 21 wherein the binding means including a flexible member wrapped around the bundles after they are gathered together.

23. The apparatus of claim 22 wherein the binding means includes a spiral member wrapping around the bundle.

24. The apparatus of claim 18 wherein the bundle is comprised of a central coolant carrying tubing surrounded by a plurality of beverage carrying tubing sections.

* * * * *